(12) United States Patent
Mu

(10) Patent No.: US 11,165,349 B2
(45) Date of Patent: Nov. 2, 2021

(54) BACKWARD COMPATIBLE BATTERY DC CHARGER AND METHODS USING AN ON-BOARD CHARGER

(71) Applicant: Atieva, Inc., Newark, CA (US)

(72) Inventor: Mingkai Mu, Fremont, CA (US)

(73) Assignee: Alieva, Inc., Newark, CA (US)

( * ) Notice: Subject to any disclaimer, the term of this patent is extended or adjusted under 35 U.S.C. 154(b) by 263 days.

(21) Appl. No.: 16/359,371

(22) Filed: Mar. 20, 2019

(65) Prior Publication Data

US 2020/0304026 A1 Sep. 24, 2020

(51) Int. Cl.
| | |
|---|---|
| H02M 3/158 | (2006.01) |
| B60L 53/16 | (2019.01) |
| H02M 7/12 | (2006.01) |
| H02J 7/02 | (2016.01) |
| H02M 1/42 | (2007.01) |
| B60L 53/10 | (2019.01) |

(52) U.S. Cl.
CPC .......... *H02M 3/1582* (2013.01); *B60L 53/11* (2019.02); *B60L 53/16* (2019.02); *H02J 7/022* (2013.01); *H02M 1/4208* (2013.01); *H02M 7/12* (2013.01)

(58) Field of Classification Search
USPC ....................................................... 320/109
See application file for complete search history.

(56) References Cited

U.S. PATENT DOCUMENTS

| | | | |
|---|---|---|---|
| 10,505,455 B1* | 12/2019 | Biskup | H02M 3/1582 |
| 2012/0169280 A1 | 7/2012 | Chi et al. | |
| 2016/0214493 A1 | 7/2016 | Herke et al. | |
| 2018/0105059 A1* | 4/2018 | Namou | H02J 7/0072 |
| 2018/0281608 A1* | 10/2018 | Albanna | B60L 53/12 |
| 2019/0176729 A1* | 6/2019 | Link | B60L 58/19 |
| 2020/0304026 A1* | 9/2020 | Mu | H02J 7/02 |

FOREIGN PATENT DOCUMENTS

DE   102018006409 A1   3/2019

* cited by examiner

*Primary Examiner* — Mohammed Alam
(74) *Attorney, Agent, or Firm* — Brake Hughes Bellermann LLP

(57) ABSTRACT

Embodiments discussed herein refer to backwards compatible charging circuits and methods for charging a battery to a relatively high voltage level regardless of whether the charging station is capable of supplying power at that relatively high voltage level. The circuitry and methods according to embodiments discussed herein can use the onboard charging system to provide a voltage boosting path to increase the charge voltage from a legacy voltage level (e.g., a relatively low voltage level) to a native voltage level (e.g., a relatively high voltage level). When a native voltage charging station is charging the battery, the circuitry and methods according to embodiments discussed herein can use a native voltage path for supplying power, received from the charging station at the native voltage, to the battery.

20 Claims, 7 Drawing Sheets

BACKWARD COMPATIBLE BATTERY DC CHARGER AND METHODS USING AN ON-BOARD CHARGER

FIELD OF THE INVENTION

The present disclosure relates to electric vehicles and plug-in hybrid electric vehicles, and in particular to DC battery chargers and methods for using an on-board charger on the vehicles.

BACKGROUND

Electric vehicles (EV) and plug-in hybrid electric vehicles (PHEV) use batteries to power one or more motors to propel the vehicle. The batteries are designed to be charged and operate within a fixed range of voltage levels. As EV and PHEV technology matures, a trend is emerging to use the batteries at higher voltages. Higher voltages reduce the current, which translates into cheaper cables and connectors. However, as battery voltage standards evolve, legacy charging stations may not be designed or able to supply power at the requisite voltage levels to satisfy the higher voltage levels. Accordingly, what is needed are circuits and methods to cheaply and efficiently charge higher voltage batteries regardless of whether the charging station is a high voltage charging station or a legacy charging station.

BRIEF SUMMARY

Embodiments discussed herein refer to backwards compatible charging circuits and methods for charging a battery to a relatively high voltage level regardless of whether the charging station is capable of supplying power at that relatively high voltage level. The circuitry and methods according to embodiments discussed herein can use the onboard charging system to provide a voltage boosting path to increase the charge voltage from a legacy voltage level (e.g., a relatively low voltage level) to a native voltage level (e.g., a relatively high voltage level). When a native voltage charging station is charging the battery, the circuitry and methods according to embodiments discussed herein can use a native voltage path for supplying power, received from the charging station at the native voltage, to the battery.

In one embodiment, a vehicle transportation system is provided that includes a charging port having an AC input and a DC input, a battery, an onboard charging (OBC) system, legacy path contactors, native path contactors, and control circuitry coupled to OBC system and the plurality of contactors. The control circuitry can be operative to charge the battery using one of a native path and a legacy path based on a determination of whether DC power supplied to the DC input of the charging port is at a native voltage level or a legacy voltage level, wherein the native path comprises the native path contactors, wherein the native path contactors are closed to enable the native voltage level to charge the battery, and wherein the legacy path comprises the legacy path contactors and the OBC system, wherein the control circuitry uses the OBC system as a boost converter to boost the legacy voltage level to the native voltage level to charge the battery.

In another embodiment, a method for charging a battery in a vehicle transportation system including a port, a plurality of contactors, a battery, and an onboard charging (OBC) system is provided. The method can include determining whether supply power voltage available at the port is provided at one of an AC voltage, a DC legacy voltage level, and a DC native voltage level. If the supply power voltage is provided as the AC voltage, the method can include using the OBC system to convert received AC power to DC power and charge the battery via an AC-to-DC path. If the supply power voltage is provided at the DC legacy voltage level, the method can include activating the plurality of contacts corresponding to a DC legacy path uses the OBC system to boost the supply power voltage from the legacy voltage level to the native voltage level to charge the battery at the native voltage level. If the supply power voltage is provided at the DC native voltage level, the method can include activating the plurality of contacts corresponding to a DC native path to bypass the OBC system and directly charge the battery at the native voltage level.

In yet another embodiment, battery charging circuitry is provided that can include a charging port having an AC input and a DC input, a battery, and an onboard charging (OBC) system coupled to the AC input and the battery. The OBC system can include a filter coupled to the AC input, power factor correction circuitry coupled to the filter, and DC-DC converter circuitry coupled to the power factor correction circuitry and the battery. The battery charging circuitry can include legacy path contactors coupled to the DC input and the filter, native path contactors coupled to the DC input and the battery, and control circuitry operative to route power to the battery via a native path when a supply voltage is determined to be a DC native voltage, wherein the native path includes the native path contactors, and route power to the battery via a legacy path when the supply voltage is determined to be a DC legacy voltage, wherein the legacy path includes the legacy path connectors and at a portion of the OBC system.

A further understanding of the nature and advantages of the embodiments discussed herein may be realized by reference to the remaining portions of the specification and the drawings.

DETAILED DESCRIPTION

Illustrative embodiments are now described more fully hereinafter with reference to the accompanying drawings, in which representative examples are shown. Indeed, the disclosed communication systems and methods may be embodied in many different forms and should not be construed as limited to the embodiments set forth herein. Like numbers refer to like elements throughout.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

Figure 1:
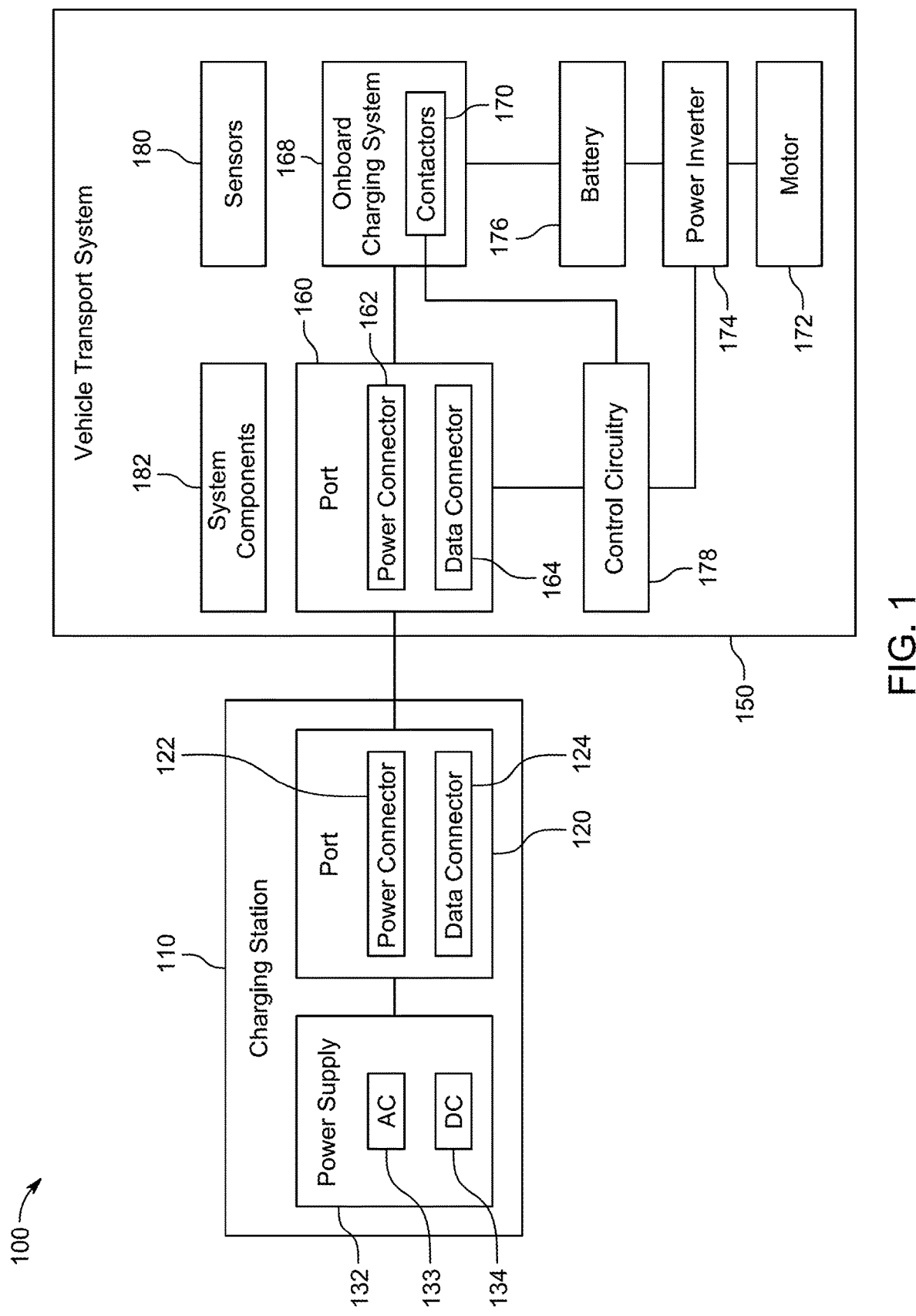
FIG. 1 shows illustrative system according to an embodiment.

FIG. 1 shows illustrative system 100 that can include charging station 110 and vehicle transport system 150 according to an embodiment. Charging station 110 can include port 120 that is designed to couple to port 160 of vehicle system 150. Port 120 may include power connectors 122, data connectors 124, and any other suitable connector (not shown). Port 120 may embody one of the known standards for transferring charge from electric vehicle supply equipment (EVSE) to a vehicle such as, for example, one-phase AC connectors such as a SAE J 1772, three-phase AC connectors such as a Mennekes type 2, combined charging connectors (that include both AC and DC pins), DC only connectors, and the CHAdeMO connector. Charging station 110 can also include power supply 132, which may provide the AC power 133, DC power 134, or both AC and DC power required by vehicle system 150. Charging station 110 can include other components such as data storage, a controller, and communications circuitry (all of which are not shown to avoid overcrowding the drawing). The data storage may be any suitable storage mechanism for storing large amounts of data such as a hard-drive or a solid state drive, or cloud storage. The controller may be operative to control the flow of data from port 120 to the data storage to the communications circuitry. The communications circuitry may include any two-way wired or wireless communications for transmitting data between the data storage and a remote server (not shown).

Vehicle transport system 150 can include port 160, which may include power connectors 162, data connectors 164, and any other connections (not shown). Port 160 may be the reciprocal version of port 120 and is designed to interface therewith. System 150 can include onboard charging system 168, contactors 170, motor 172, inverter 174, battery 176, control circuitry 178, sensors 180, and system components 182. Contactors 170 may be electronically controlled mechanical switches that can be selectively turned ON and OFF to route power to battery 176 via a power routing path according to embodiments discussed herein. Motor 172 may represent the one or more motors used to propel system 150. Motor 172 may be, for example, a three phase induction motor. Inverter 174 may include the electronics required to drive motor 172. In some embodiments, inverter 174 may be a traction inverter. Battery 176 may be a relatively high voltage battery that supplies power to the motor, which propels the car. The voltage level or range of voltages at which battery 176 operates may be referred to herein as a native voltage. Sensors 180 can include, for example, a global positioning system, an inertial measurement system, a radar unit, a laser rangefinder/LIDAR unit, and a camera. System components 182 can include propulsion system elements such as, for example, motor 172, engine, transmission, and wheels/tires, control system elements such as, for example, a steering unit, throttle, brake unit, sensor fusion algorithms, computer vision systems, navigation system, and an obstacle avoidance system, and peripherals such as, for example, a wireless communications system, a touch screen, a microphone, and a speaker. System components 182 can also include a computer system, which can include one or more processors and instructions. System 150 can include data storage for storing, for example, data collected by sensors 180.

Ports 120 and 160 can include mating sets of electromechanical contacts that provide a physical connection at the vehicle interface for the power conductors, an equipment grounding conductor, a control pilot conductor, and a proximity sense conductor to provide a signal that helps reduce electrical arcing of the coupler during disconnect. Thus, the interface typically has at least five contacts that perform the interface functions. In addition, the coupler can include a latching mechanism to prevent inadvertent or accidental decoupling. The latching mechanism may also serve to properly align the connector with the vehicle inlet by requiring a latch element projecting from the connector to be registered with a cooperating latch element in the vehicle inlet.

Onboard charging (OBC) system 168 is a system that can convert AC power received at port 160 to DC power. The OBC converted DC power is provided to battery 176. OBC system 168 may be implemented in many different approaches. For example, in one embodiment, OBC system 168 can be a rectifier. In another embodiment, OBC system 168 can include a rectifier with a DC-DC converter. In yet another embodiment, OBC system 168 can include a filter, a rectifier, and a DC-DC converter. Other configurations of OBC system 168, such as those discussed below, may also be used.

When ports 120 and 160 are connected together, a handshaking operation can commence so that vehicle system 150 can determine what type of power can be supplied by charging station 110. Charging station 110 may supply AC power 133 or DC power 134. For example, in some embodiments, charging station 110 may be a legacy charging station that provides power at a legacy voltage level. As defined herein, a legacy voltage level is a relatively low voltage level that is substantially less than a native voltage level of the battery (e.g., battery 176). As defined herein, a native voltage level is a relatively high voltage level at which the battery is charged and operates. Both native and legacy voltage levels refer to a DC voltage level. As another example, charging station 110 may be a native charging station that provides power at the native voltage level. Embodiments discussed herein can route power from port 160 to battery 176 through an AC-to-DC path, which uses OBC system 168 to convert received AC power to the native voltage level, a legacy path, which boosts the legacy voltage to the native voltage, or a native path, based on which type of charging station 110 is connected to port 160. As defined herein, a native path refers to a path where the power supplied by the charging station is at the native voltage and requires no manipulation of the voltage (e.g., boosting of voltage from one level to another level) to deliver power to the battery. As defined herein, a legacy path refers to a path where the power supplied by the charging station is at the legacy voltage and manipulation of the voltage level is required to boost the voltage to the native voltage for delivery to the battery. As defined herein, the AC-to-DC path refers to path where power is supplied as AC and OBC system 168 is used to convert the AC voltage to a DC voltage suitable for battery 176. Control circuitry 178 can select one of the AC-to-DC, native, and legacy paths by selectively activating contactors 170. Depending on which contactors are turned ON or OFF, current is forced to flow through the desired path to ensure that the DC voltage is provided to battery 176 at its native voltage level.

Although vehicle transport system 150 is described in the context of an automobile or truck, system 100 may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

Figure 2:
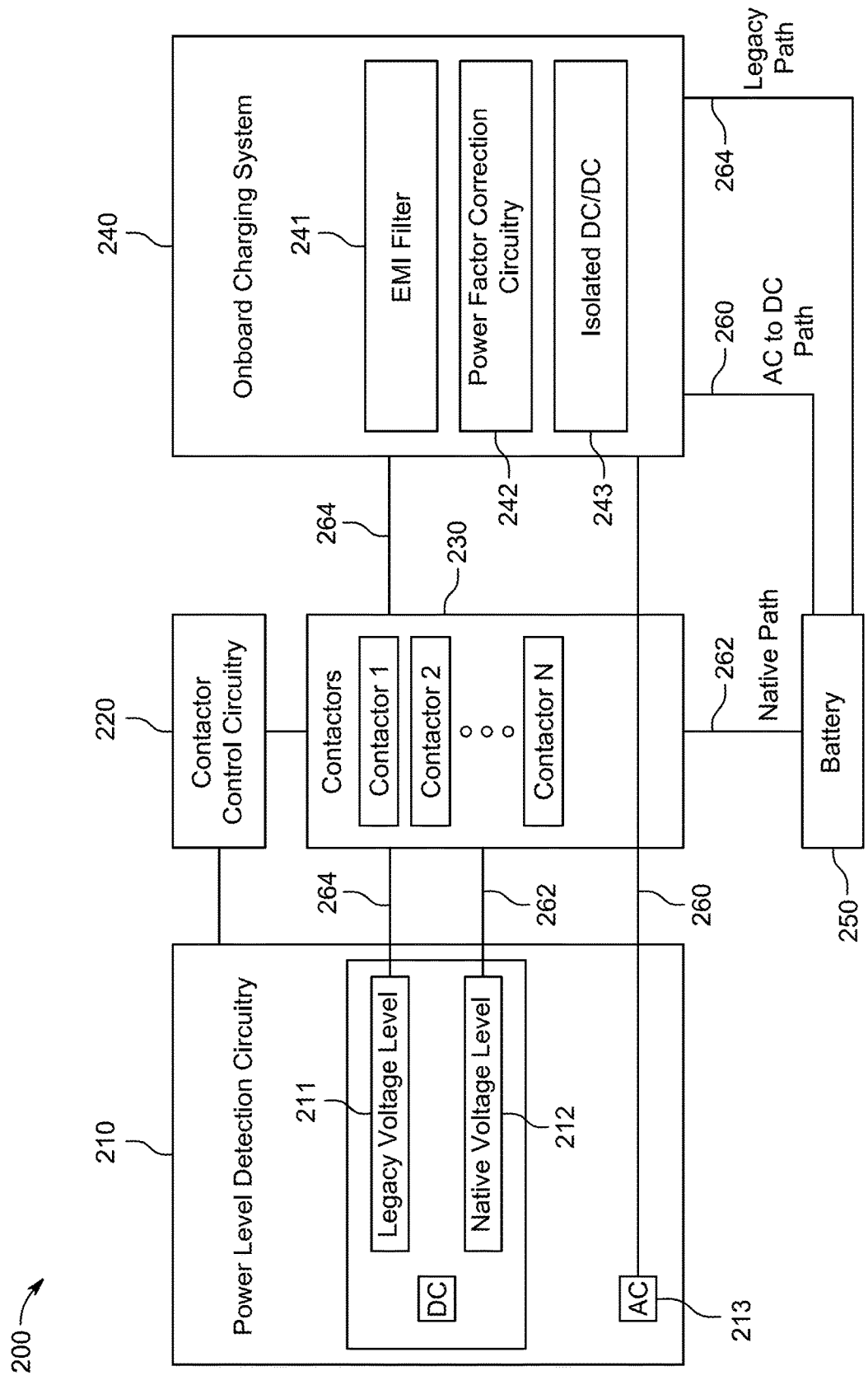
FIG. 2 shows an illustrative block diagram of power routing circuitry according to an embodiment.

FIG. 2 shows an illustrative block diagram of power routing circuitry (PRC) 200 according to an embodiment. PRC 200 can include power level detection circuitry 210, contactor control circuitry 220, contactors 230, onboard charging system 240, and battery 250. PRC 200 also shows AC-to-DC path 260, native path 262, and legacy path 264 as shown. Contactors 230 can include any number of contactors necessary for routing power to battery 250. As discussed below, different charging circuit topologies utilize contactors in various arrangements to route power. Onboard charging system 240 has the ability to convert AC power received from a charging station and convert it to DC power. OBC system 240 can include an EMI filter 241, power factor correction circuitry 242, and DC-DC converter 243. EMI filter 241 may filter out noise that may be present on the AC power input (e.g., noise existing on the power lines supplying the AC power to the charging station) and may also serve as a first level of protection for downstream circuitry that handles the AC power. Power factor correction circuitry 242 can rectify the AC power to DC power while maintaining a power factor of 1. The DC power supplied by circuitry 242 can be a "rough" DC voltage with a superimposed AC ripple. DC-DC converter 243 may be an isolated DC-DC convert that isolates circuitry 242 from downstream circuitry, including battery 250. DC-DC converter 243 can refine rough DC voltage to a fine DC voltage that has less AC ripple than the DC voltage provided by circuitry 242.

During a connection event with a charging station (e.g., station 110), power level detection circuitry 210 may determine (e.g., via a handshake process) whether the available power is legacy voltage level power 211, native voltage level power 212, or AC power 213. Depending on this determination, contactor control circuitry 220 can selectively activate one or more of contactors 230 to route power over one of AC-to-DC path 260, native path 262 and legacy path 264. If the available power is AC power 213, power may be routed via AC-to-DC path 260 to battery 250. AC-to-DC path 260 uses OBC system 240 to convert the AC power to DC power suitable for use by battery 250. In some embodiments, no contactors 230 may be required to the route power via AC-to-DC path 260. In other embodiments, one or more contactors 230 may form part of AC-to-DC path 260. In such embodiments, one or more of contactors 230 are OPEN or CLOSED depending on what the configuration necessary to complete AC-to-DC path 260.

If the available power is at DC native voltage level 212, power is routed via native path 262. Native path 262 can route the DC power directly to battery 250 via contactors 230, effectively bypassing OBC system 240. OBC system 240 can be bypassed because the native voltage level does not require any conversion prior to being applied to battery 250. If the available power is at DC legacy voltage level 211, power is routed via legacy path 264. Legacy path 264 can route the DC power directly to battery 250 via contactors 230 and OBC system 240. OBC system 240 is utilized to boost the legacy voltage level to the native voltage level.

Figure 3:
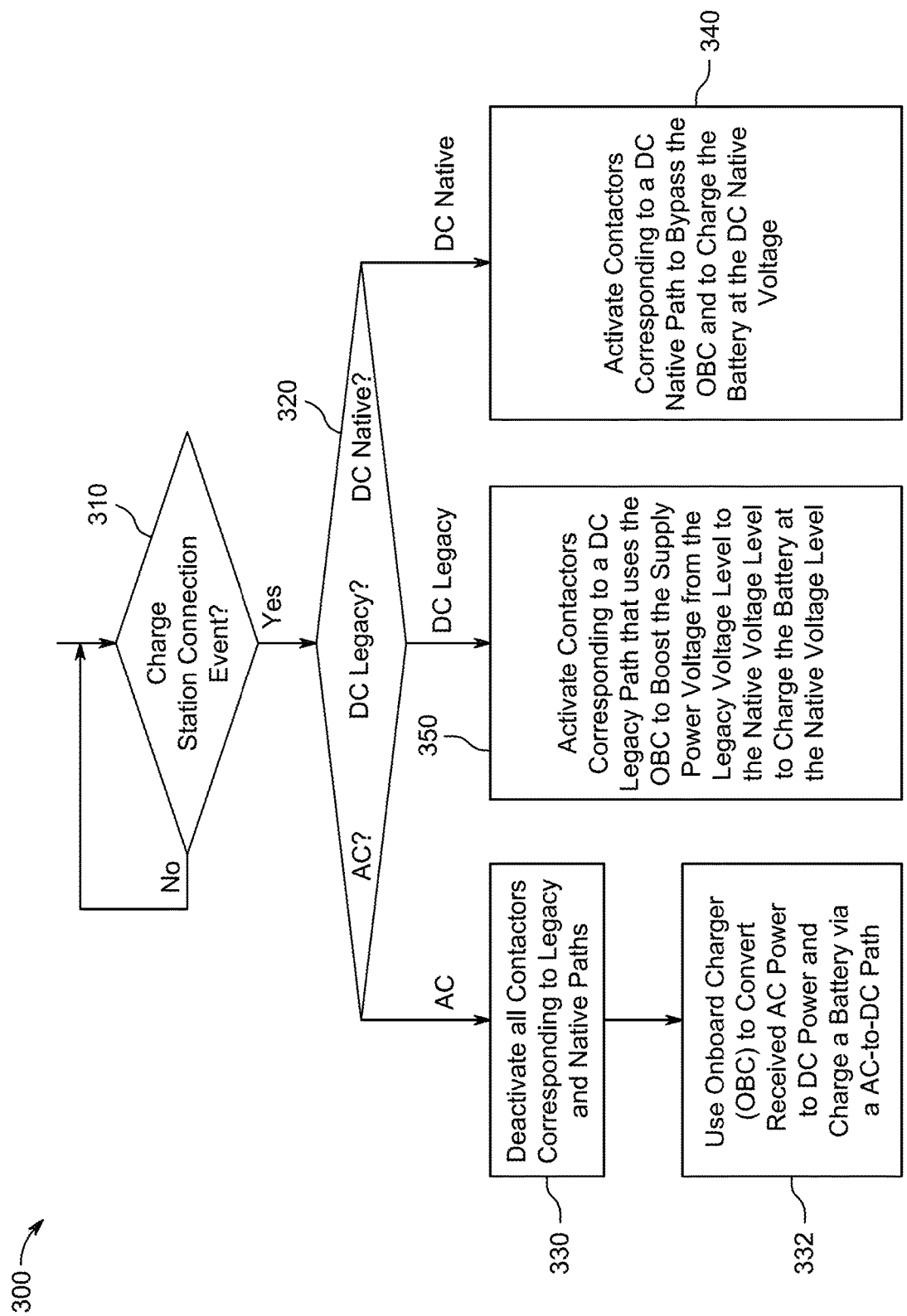
FIG. 3 shows illustrative process for routing power from a charging station to a battery according to an embodiment.

FIG. 3 shows illustrative process 300 for routing power from a charging station to a battery according to an embodiment. Process 300 may be implemented within vehicle transport system 150 or PRC 200, for example. Starting at step 310, a determination is made whether there is charge station connection event. If the determination is NO, process 300 may loop back to step 310. If the determination is YES, process 300 may determine a voltage level available from the charging station, at step 320. If the determination indicates that the available voltage level corresponds to AC power, process 300 may deactivate all contactors corresponding to the native and legacy paths (step 330) and use an OBC system to convert received AC power to DC power and charge a battery (e.g., battery 250) via an AC-to-DC path (e.g., path 260), as shown by step 332. It should be noted that step 330 is optional, and that in some embodiments, some contactors may need to be closed in order to convey power to the battery.

If the determination at step 320 is that available power is at the DC native voltage level, process 300 may activate contactors corresponding to a DC native path to bypass the OBC system and to charge the battery at the received DC native voltage (step 340). If the determination at step 320 is that available power is at the DC legacy voltage level, process 300 may activate contactors corresponding to a DC legacy path that uses the OBC system to boost the supply power voltage from the legacy voltage level to the native voltage level to charge the battery at the native voltage level. Exemplary circuit topologies for boosting the voltage are shown and described in connection with FIGS. 4-7 below.

It should be understood that the steps in FIG. 3 are merely illustrative and that additional steps may be added and the order to the steps may be rearranged.

Figure 4A:
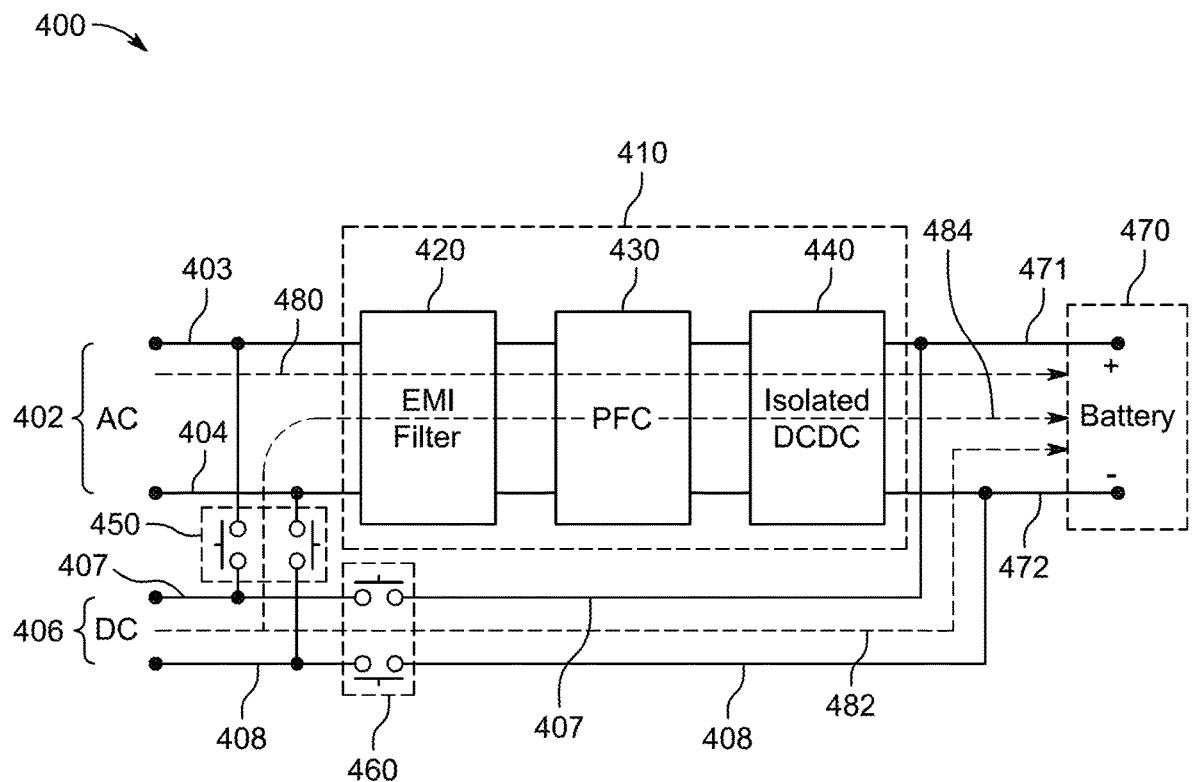
FIG. 4A shows illustrative block diagram of charging circuitry according to an embodiment.
Figure 4B:
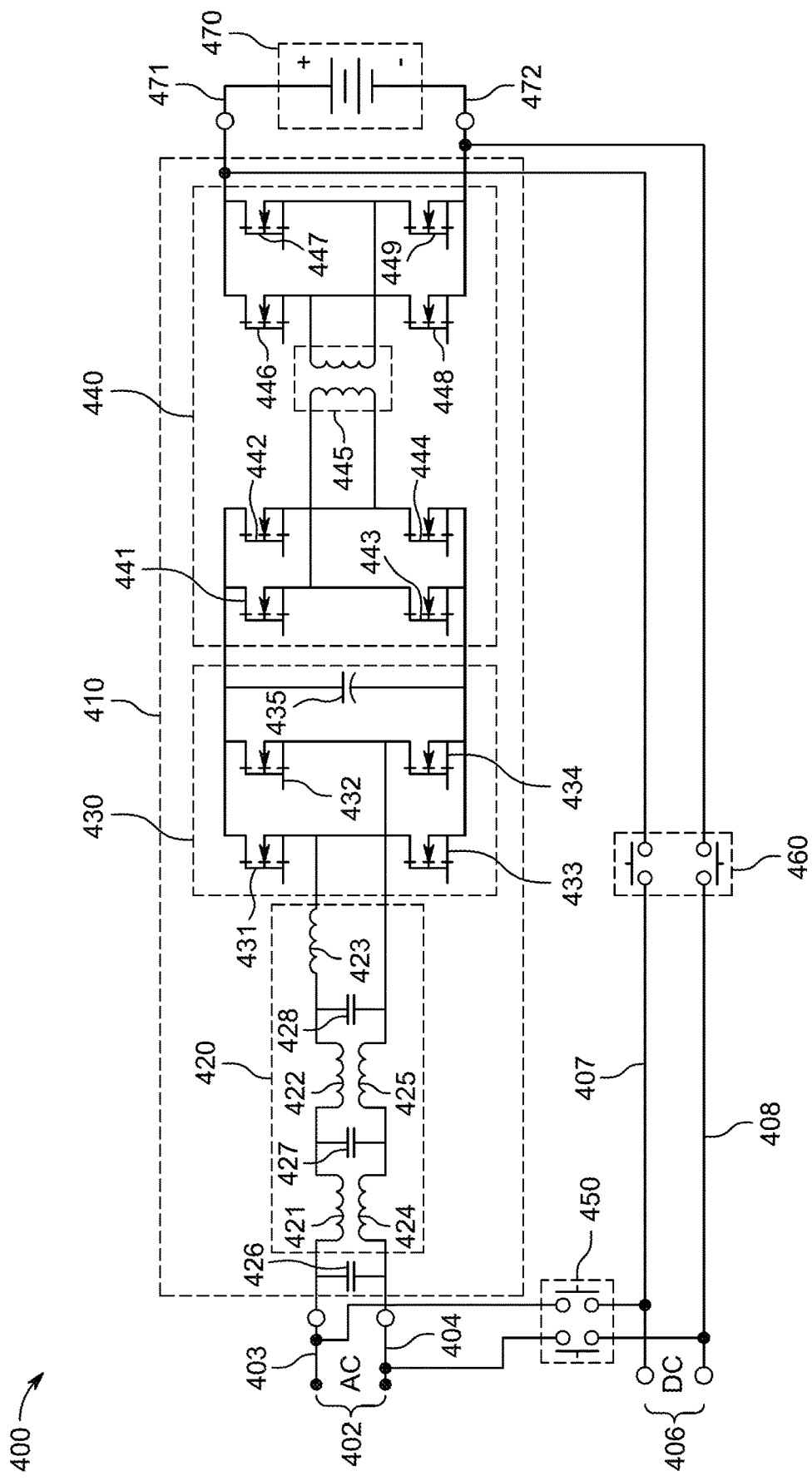
FIG. 4B shows illustrative circuit diagram of charging circuitry according to an embodiment.

FIG. 4A shows illustrative block diagram of circuitry 400 according to an embodiment. FIG. 4B shows a simplified circuit diagram of circuitry 400. FIGS. 4A and 4B are referred to collectively herein. Circuitry 400 can include AC input 402, DC input 406, OBC system 410, which can include EMI filter 420, power factor correction circuitry 430, and isolated DC-DC converter 440, legacy path contactors 450, native path contactors 460, and battery 470. One or both of EMI filter 420 and power factor correction circuitry 430 can serve as first conversion stage circuitry (e.g., an AC-to-DC converter). DC-DC converter 440 can serve as second conversion stage circuitry (e.g., a DC-to-DC converter). AC input 402 is connected to busses 403 and 404, optionally through contactors or relays (not shown in the diagram), and DC input is connected to busses 407 and 408. Battery 470 is connected to busses 471 and 472, which are connected to DC-DC converter 440. AC-to-DC path 480, native path 482, and legacy path 484 are also shown.

EMI filter 420 can include inductors 421-423 arranged in series as shown, inductors 424 and 425 as shown. EMI filter 420 can include capacitors 426-428 as shown. Power factor correction circuitry 430 can include switches 431-434 arranged as shown, and capacitor 435. The voltage capacitor 435 may represent the rough DC voltage. Switches 431-434 can be controlled by control electronic (not shown) to convert the filter AC signal received from filter 420 to a DC signal. DC-DC converter 440 can include switches 441-444, transformer 445, and switches 446-449. Transformer 445 can isolate battery 470 from the input side of OBC system 410. Switches 441-444 and 446-449, in combination with transformer 445, can be controlled by control circuitry (not shown) to control conversion of the rough DC signal to a fine DC signal (e.g., boost rough DC signal to the native voltage level).

When AC-to-DC path 480 is used, contactors 450 and 460 are opened to disconnect DC input 406 from busses 403, 404, 471, and 472. This enables only OBC system 410 to route power from AC input 402 to battery 470.

When native path 482 is used, contactors 450 are opened to disconnect DC input 406 from busses 403 and 404, and contactors 460 are closed to connect DC input 406 to busses 471 and 472. Closing contacts 460 directly couples DC input 406 to battery 470, thus enabling the native DC voltage to bypass OBC 410 and charge battery 470 at the native voltage level.

When legacy path 484 is used, contactors 460 are opened to disconnect DC input 406 from busses 471 and 472, and contactors 450 are closed to connect DC input 406 to busses 403 and 404. Connecting DC input 406 to OBC system 410 via closed contactors 450, enables OBC system 410 to boost the legacy voltage to the native voltage. The DC power passes through filter 420 and circuitry 430 at a legacy voltage level, but DC-DC converter 440 up converts the legacy voltage level to the native voltage level. Control electronics (not shown) may control converter 440 to achieve the desired voltage boost.

The power rating of circuitry 400 is limited by the AC charging rating of OBC system 410. For example, if the AC charging rating of OBC system 410 is 22 kW, the DC charging rating may also be 22 kW. It should be understood that circuitry 400 can be used with single phase AC or multiple phase AC.

Figure 5:
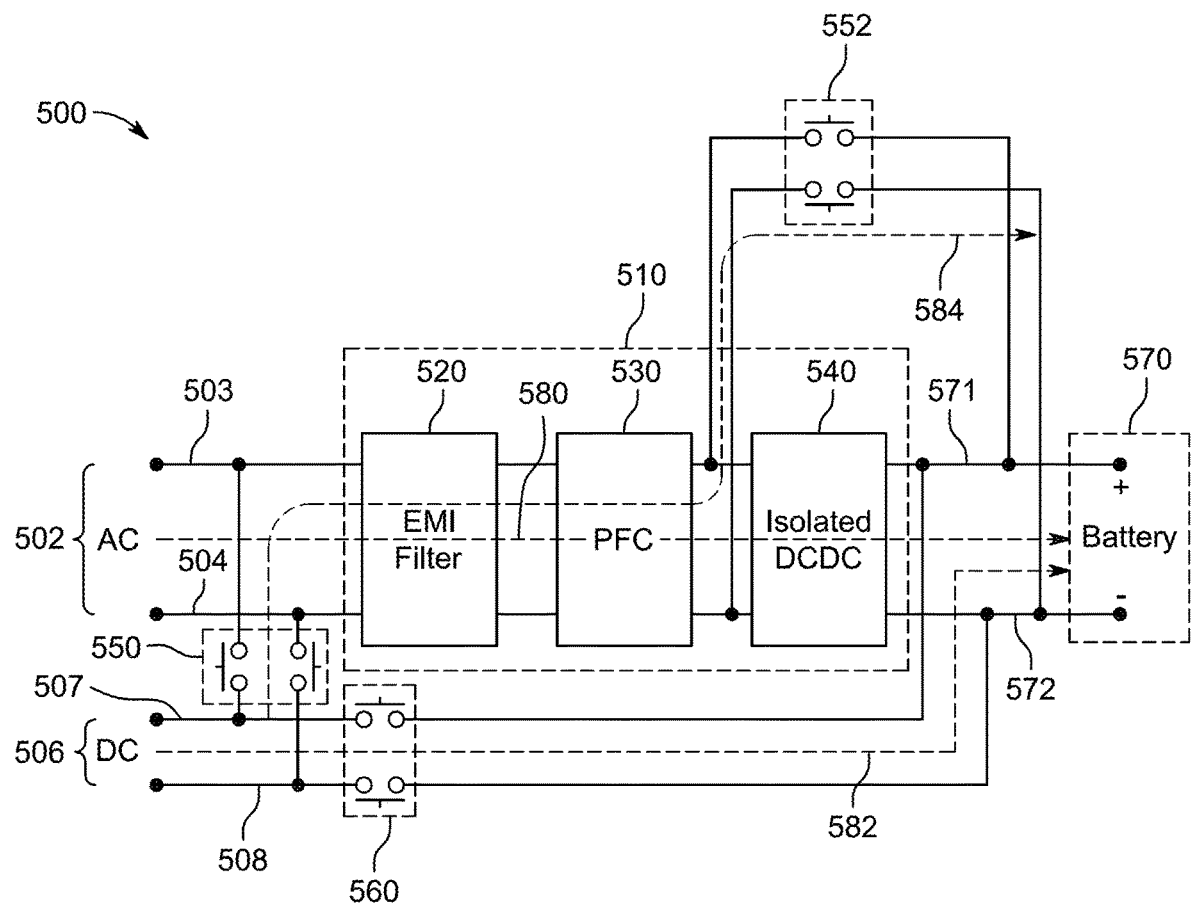
FIG. 5 shows another illustrative block diagram of charging circuitry according to an embodiment.

FIG. 5 shows illustrative block diagram of circuitry 500 according to an embodiment. Circuitry 500 can include AC input 502, DC input 506, OBC system 510, which can include EMI filter 520, power factor correction circuitry 530, and isolated DC-DC converter 540, legacy path contactors 550, bypass contactors 552, native path contactors 560, and battery 570. AC input 502 is connected to busses 503 and 504, optionally through contactors or relays (not shown in the diagram), and DC input is connected to busses 507 and 508. Battery 570 is connected to busses 571 and 572, which are connected to DC-DC converter 540. AC-to-DC path 580, native path 582, and legacy path 584 are also shown. Circuitry 500 is similar to circuitry 400, but includes addition of bypass contactors 552. AC-to-DC path 580 and native path 582 operate the same as paths 480 and 482, discussed above, except that bypass contactors 552 are OPEN when one of paths 580 and 582 is used.

When AC-to-DC path 580 is used, contactors 550 and 560 are opened to disconnect DC input 506 from busses 503, 504, 571, and 572. Bypass contactors 552 are opened to prevent DC-DC converter 540 from being bypassed. Thus, when AC-to-DC path 580 is used, only OBC system 510 routes power from AC input 502 to battery 570.

When native path 582 is used, contactors 550 are opened to disconnect DC input 506 from busses 503 and 504, and contactors 560 are closed to connect DC input 506 to busses 571 and 572. Bypass contactors 552 can be opened to prevent DC-DC converter 540 from being bypassed. Closing contacts 560 directly couples DC input 506 to battery 570, thus enabling the native DC voltage to bypass OBC 510 and charge battery 570 at the native voltage level.

The addition of contactors 552 enables DC-DC converter 540 to be bypassed when legacy path 584 is used. DC-DC converter 540 is redundant in legacy path 584 as isolation is not needed. When legacy path 584 is used, contactors 560 are opened to disconnect DC input 506 from busses 571 and 572, contactors 550 are closed to connect DC input 506 to busses 503 and 504, and connectors 552 are closed to bypass converter 540 (by directly connecting circuitry 530 to battery 570). Power is routed from DC input 506, through contactors 550 to filter 520, and then to circuitry 530, which boosts the power from the legacy voltage level to the native voltage level. The power signal, which is now at the native voltage level, is provided directly to battery 570 via contactors 552. Converter 540 may be turned OFF to prevent any current flow from circuitry 530 to flow through converter 540 to battery 570. Control electronics (not shown) may control circuitry 430 to achieve the desired voltage boost.

The power rating for circuitry 500 is limited by power factor correction circuitry 530. If the OBC's AC charging rate is 20 kW, the DC charging rating of power factor correction circuitry 530 may be around 35 kW or other power rating that is higher than the power rating of the OBC system 510. FIG. 5 is illustrated as using single phase AC. It should be understood that circuitry 500 can be used with single phase AC or multiple phase AC with similar ideas.

Figure 6:
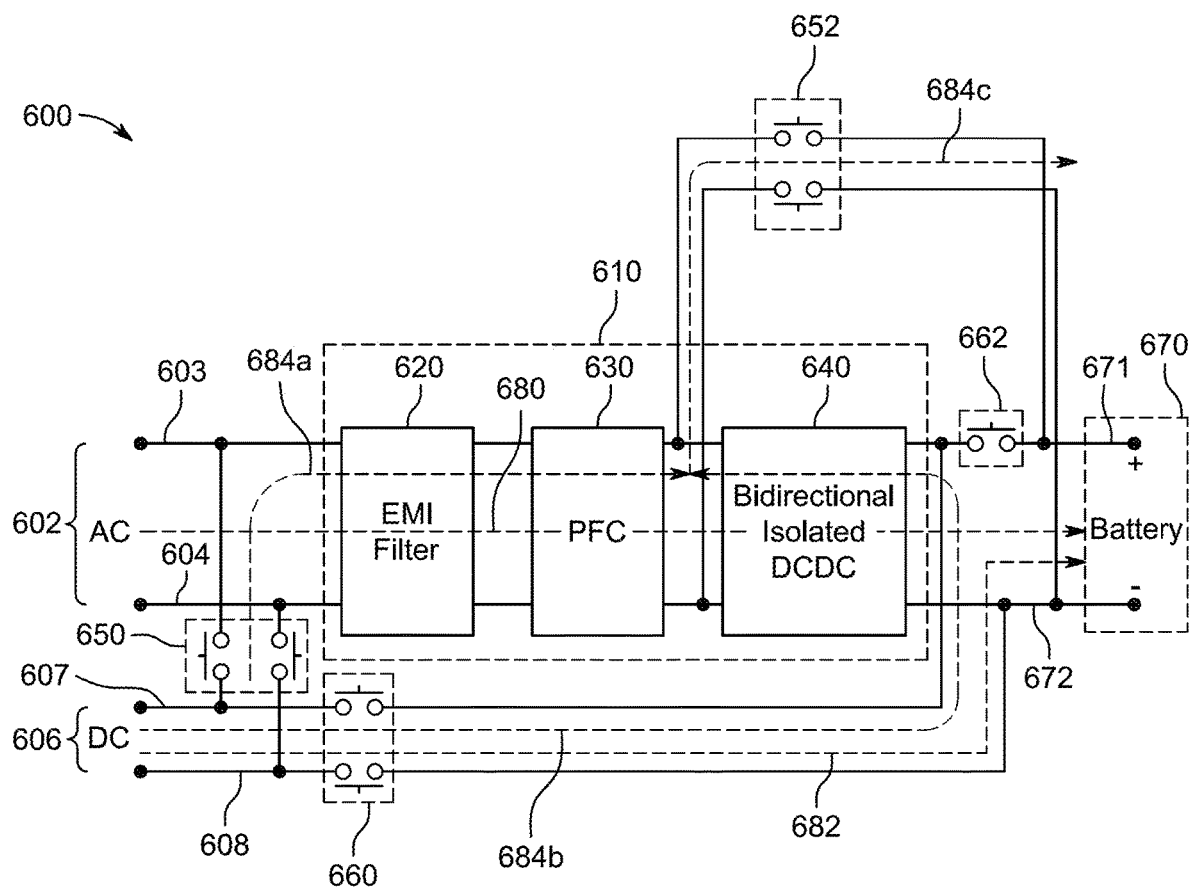
FIG. 6 shows yet another illustrative block diagram of charging circuitry according to an embodiment.

FIG. 6 shows illustrative block diagram of circuitry 600 according to an embodiment. Circuitry 600 can include AC input 602, DC input 606, OBC system 610, which can include EMI filter 620, power factor correction circuitry 630, and isolated DC-DC converter 640, legacy path contactors 650, bypass contactors 652, native path contactors 660, and battery path contactor 662, and battery 670. AC input 602 is connected to busses 603 and 604, optionally through contactors or relays (not shown in the diagram), and DC input is connected to busses 607 and 608. Battery 670 is connected to busses 671 and 672, which are connected to bidirectional DC-DC converter 640. AC-to-DC path 680, native path 682, and legacy path 682a-c are also shown. Circuitry 600 is similar to circuitry 500, but includes addition of battery path contactor 662 positioned on bus 671 between DC-DC converter 640 and battery 670. AC-to-DC path 680 and native path 682 operate the same as paths 580 and 582, discussed above, except that contactors 652 are OPEN and contactor 662 is CLOSED when one of paths 680 and 682 is used. In addition, DC-DC converter 640 is bi-directional as opposed to a unidirectional DC-DC converter.

When AC-to-DC path 680 is used, contactors 650 and 660 are opened to disconnect DC input 606 from busses 603, 604, 671, and 672. Contactors 652 are opened to prevent DC-DC converter 640 from being bypassed. Contactor 662 is closed to connect battery 670 to DC-DC converter 640. Thus, when AC-to-DC path 680 is used, only OBC system 610 routes power from AC input 602 to battery 670.

When native path 682 is used, contactors 650 are opened to disconnect DC input 606 from busses 603 and 604, contactors 660 are closed to connect DC input 606 to busses 671 and 672, and contactor 662 is closed to connect busses 607 and 671 together. Contactors 652 are opened. Closing contacts 660 and 662 directly couples DC input 606 to battery 670, thus enabling the native DC voltage to bypass OBC 610 and charge battery 670 at the native voltage level.

When legacy paths 684a-c are used, contactors 650, 652, and 660 are closed, and contactor 662 is opened. Legacy path 684a directs power from DC input 606 via contactors 650, filter 620, and power factor correction circuitry 630. Power factor correction circuitry 630 can boost the legacy voltage level to the native voltage level and supply the native voltage signal to battery via path 684c (which includes contactors 652). Legacy path 684b directs power from DC input 606 via contactors 660 and DC-DC converter 640. The bidirectional DC-DC converter can boost the legacy voltage level to the native voltage level and supply the native voltage signal to battery 670 via path 684c. In this approach, the power being directed by paths 684a and 684b is summed together at path 684c. This results in full utilization of the power capability of OBC system 610. For example, if the OBC's AC charging rating is 20 kW, the power rating of circuitry 600 can be 50 kW, when input voltage is 400V DC. It should be understood that circuitry 600 can be used with single phase AC or multiple phase AC.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Moreover, any processes described with respect to FIGS. 1-6, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A vehicle transportation system, comprising:
   a charging port comprising an AC input and a DC input;
   a battery;
   an onboard charging (OBC) system;
   legacy path contactors;
   native path contactors; and
   control circuitry coupled to the OBC system and the legacy path contactors and the native path contactors, the control circuitry operative to:
      charge the battery using one of a native path and a legacy path based on a determination of whether DC power supplied to the DC input of the charging port is at a native voltage level or a legacy voltage level,
      wherein the native path comprises the native path contactors, wherein the native path contactors are closed to enable the native voltage level to charge the battery; and
      wherein the legacy path comprises the legacy path contactors and the OBC system, wherein the control circuitry uses the OBC system as a boost converter to boost the legacy voltage level to the native voltage level to charge the battery.

2. The system of claim 1, wherein the battery operates at the native voltage level, and wherein the native voltage level has a higher voltage level than the legacy voltage level.

3. The system of claim 1, wherein the control circuitry is operative to charge the battery via an AC path when AC power is available on the AC input of the charging port, wherein the AC path uses the OBC system to charge the battery, and wherein the legacy path contactors and the native path contactors are opened to disconnect the DC input from the AC path and the battery.

4. The system of claim 1, wherein the native path contactors are coupled to the DC input and the battery, wherein the control circuitry is operative to close the native path contactors to directly couple the DC input of the charging port to the battery.

5. The system of claim 1, wherein the OBC system comprises:
   first and second busses connected to the AC input of the charging port and to the legacy path contactors;
   first conversion stage circuitry coupled to the first and second busses; and
   second conversion stage circuitry coupled to the first conversion stage circuitry and the battery.

6. The system of claim 5, wherein the legacy path contactors and the native path contactors are coupled to the DC input, and wherein, when the legacy voltage level is supplied to the DC input, the control circuitry is operative to:
   open the native path contactors;
   close the legacy path contactors; and use the OBC system to boost the legacy voltage level of the DC power to the native voltage level.

7. The system of claim 6, wherein, when the native voltage level is supplied to the DC input, the control circuitry is operative to:
close the native path contactors to directly couple the DC input to the battery; and
open the legacy path contactors; and
wherein, when AC power is supplied to the AC input, the control circuitry is operative to:
open the native path contactors and the legacy path contactors; and
use the OBC system to charge the battery.

8. The system of claim 5, wherein the native path contactors are coupled to the DC input and the battery, and wherein the legacy path contactors are coupled to the DC input, the system further comprising:
bypass path contactors coupled to the battery and to nodes existing between the first and second conversion stage circuitries, and wherein, when the legacy voltage level is supplied to the DC input, the control circuitry is operative to:
open the native path contactors;
close the legacy path contactors and the bypass path contactors, wherein closure of the bypass path contactors bypasses the second conversion stage circuitry; and
use the first conversion stage circuitry to boost the legacy voltage level of the DC power to the native voltage level.

9. The system of claim 8, wherein, when the native voltage level is supplied to the DC input, the control circuitry is operative to:
close the native path contactors to directly couple the DC input to the battery; and
open the legacy path contactors and the bypass path contactors; and
wherein, when AC power is supplied to the AC input, the control circuitry is operative to:
open the native path contactors, the legacy path contactors, and the bypass path contactors; and
use the OBC system to charge the battery.

10. The system of claim 5, wherein the native path contactors are coupled to the DC input, the second conversion stage circuitry, and to a second terminal of the battery, and wherein the legacy path contactors are coupled to the DC input, the system further comprising:
bypass path contactors coupled to the battery and to nodes existing between the first and second conversion stage circuitries;
a battery path contactor coupled to a first terminal of the battery, the second conversion stage circuitry, and to one contactor of the native path contactors, and
wherein, when the legacy voltage level is supplied via the DC input, the control circuitry is operative to:
close the native path contactors, the legacy path contactors, and the bypass path contactors;
open the battery path contactor;
use the first conversion stage circuitry to boost the legacy voltage level of the DC power routed via the legacy path contactors to the native voltage level; and
use the second conversion stage circuitry to boost the legacy voltage level of the DC power routed via the native path contactors to the native voltage level such that outputs of the first conversion stage circuitry and the second conversion stage circuitry are combined and routed via the bypass path contactors to charge the battery.

11. The system of claim 10, wherein, when the native voltage level is supplied to the DC input, the control circuitry is operative to:
close the native path contactors and the battery path contactor to directly couple the DC input to the battery; and
open the legacy path contactors and the bypass path contactors; and
wherein, when AC power is supplied to the AC input, the control circuitry is operative to:
open the native path contactors, the legacy path contactors, and the bypass path contactors;
close the battery path contactor; and
use the OBC system to charge the battery.

12. A method for charging a battery in a vehicle transportation system comprising a port, a plurality of contactors, a battery, and an onboard charging (OBC) system, the method comprising:
determining whether supply power voltage available at the port is provided at one of an AC voltage, a DC legacy voltage level, and a DC native voltage level;
if the supply power voltage is provided as the AC voltage:
using the OBC system to convert received AC power to DC power and charge the battery via an AC-to-DC path;
if the supply power voltage is provided at the DC legacy voltage level:
activating the plurality of contactors corresponding to a DC legacy path and using the OBC system to boost the supply power voltage from the DC legacy voltage level to the DC native voltage level to charge the battery at the DC native voltage level; and
if the supply power voltage is provided at the DC native voltage level:
activating the plurality of contactors corresponding to a DC native path to bypass the OBC system and directly charge the battery at the DC native voltage level.

13. The method of claim 12, wherein the OBC system comprises first conversion circuitry and second conversion circuitry, and the method further comprising:
wherein if the supply power voltage is provided at the DC legacy voltage level:
using the first conversion circuitry to boost the supply power voltage from the DC legacy voltage level to the DC native voltage level; and
bypassing the second conversion circuitry by routing an output of the first conversion circuitry directly to the battery.

14. The method of claim 12, wherein the OBC system comprises first conversion circuitry and second conversion circuitry, and the method further comprising:
wherein if the supply power voltage is provided at the DC legacy voltage level:
using the first conversion circuitry to boost the supply power voltage from the DC legacy voltage level to the DC native voltage level; and
using the second conversion circuitry to boost the supply power voltage from the DC legacy voltage level to the DC native voltage level, wherein outputs of the first conversion circuitry and the second conversion circuitry are combined to charge the battery.

15. The method of claim 12, wherein the battery operates at the DC native voltage level, and wherein the DC native voltage level has a higher voltage level than the DC legacy voltage level.

16. Battery charging circuitry comprising:
a charging port comprising an AC input and a DC input;
a battery;
an onboard charging (OBC) system coupled to the AC input and the battery, the OBC system comprising:
a filter coupled to the AC input;
power factor correction circuitry coupled to the filter; and
DC-DC converter circuitry coupled to the power factor correction circuitry and the battery;
legacy path contactors coupled to the DC input and the filter;
native path contactors coupled to the DC input and the battery; and
control circuitry operative to:
route power to the battery via a native path when a supply voltage is determined to be a DC native voltage, wherein the native path includes the native path contactors; and
route power to the battery via a legacy path when the supply voltage is determined to be a DC legacy voltage, wherein the legacy path includes the legacy path contactors and a portion of the OBC system.

17. The battery charging circuitry of claim 16, further comprising:
bypass contactors coupled to the battery and to nodes existing between the power factor correction circuitry and the DC-DC converter circuitry, wherein the legacy path further includes the bypass contactors, and wherein the portion includes the filter and the power factor correction circuitry, but excludes the DC-DC converter circuitry.

18. The battery charging circuitry of claim 17, wherein the control circuitry is operative to use the power factor correction circuitry to boost voltage of the supply voltage to charge the battery.

19. The battery charging circuitry of claim 16, further comprising:
bypass contactors coupled to the battery and to nodes existing between the power factor correction circuitry and the DC-DC converter circuitry;
a battery contactor coupled to the battery and the DC-DC converter circuitry; and
wherein the legacy path further includes the bypass contactors, and wherein the portion includes the filter, the power factor correction circuitry, and the DC-DC converter circuitry.

20. The battery charging circuitry of claim 19, and wherein the control circuitry is operative to:
use the DC-DC converter circuitry as a bi-directional boost converter to boost voltage of the supply voltage to charge the battery; and
use the power factor correction circuitry to boost voltage of the supply voltage to charge the battery.

* * * * *

UNITED STATES PATENT AND TRADEMARK OFFICE
CERTIFICATE OF CORRECTION

PATENT NO. : 11,165,349 B2
APPLICATION NO. : 16/359371
DATED : November 2, 2021
INVENTOR(S) : Mu Page 1 of 1

It is certified that error appears in the above-identified patent and that said Letters Patent is hereby corrected as shown below:

On the Title Page

Column 1, item (73), in "Assignee", Line 1, delete "Alieva," and insert -- Atieva, --, therefor.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*